(12) United States Patent
Breed et al.

(10) Patent No.: US 6,899,134 B2
(45) Date of Patent: May 31, 2005

(54) DISCHARGE VALVES FOR AIRBAGS AND AIRBAGS INCLUDING THE SAME

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 10/278,721

(22) Filed: Oct. 23, 2002

(65) Prior Publication Data

US 2003/0075223 A1 Apr. 24, 2003

Related U.S. Application Data

(60) Provisional application No. 60/348,720, filed on Oct. 23, 2001.

(51) Int. Cl.[7] ............................................... F16K 3/00
(52) U.S. Cl. ............................. 137/625.31; 280/739
(58) Field of Search ...................... 137/625.31; 280/739

(56) References Cited

U.S. PATENT DOCUMENTS

| | | | |
|---|---|---|---|
| 3,861,712 A | | 1/1975 | Matsui et al. ......... 280/150 AB |
| 3,884,499 A | | 5/1975 | Oka et al. ............. 280/150 AB |
| 4,187,881 A | * | 2/1980 | Kull ...................... 137/625.31 |
| 4,516,606 A | * | 5/1985 | Worley ..................... 137/625.3 |
| 4,719,943 A | | 1/1988 | Perach .................. 137/625.65 |
| 5,103,869 A | * | 4/1992 | Kimura et al. ......... 137/625.28 |
| 5,219,179 A | * | 6/1993 | Eyrainer et al. ............ 280/739 |
| 5,221,109 A | | 6/1993 | Marchant .................... 280/736 |
| 5,653,464 A | | 8/1997 | Breed et al. ............. 280/743.1 |
| 5,695,214 A | | 12/1997 | Faigl et al. ................. 280/735 |
| 5,707,078 A | * | 1/1998 | Swanberg et al. .......... 280/739 |
| 5,822,707 A | | 10/1998 | Breed et al. .................. 701/49 |
| 5,855,228 A | | 1/1999 | Perach .................. 137/625.65 |
| 6,017,056 A | * | 1/2000 | Lee ............................ 280/739 |
| 6,145,878 A | * | 11/2000 | Weikl ........................ 280/739 |
| 6,199,895 B1 | | 3/2001 | Seymour ................. 280/728.2 |
| 6,241,279 B1 | * | 6/2001 | Ochiai ........................ 280/735 |

FOREIGN PATENT DOCUMENTS

WO   WO 03/011651 A2   2/2003

\* cited by examiner

Primary Examiner—John Fox
(74) Attorney, Agent, or Firm—Brian Roffe

(57) ABSTRACT

Discharge valve for an airbag including a fixed member adapted to be arranged in connection with or associated with the airbag and having a pattern of openings and a movable member having a pattern of openings substantially identical to the pattern of openings of the fixed member. The movable member is movable relative to and alongside the fixed member to vary the correspondence between the openings on the movable member and the openings in the fixed member to thereby vary valve openings defined by the fixed member and the movable member. Variation in the valve openings results in control and/or regulation of the outflow of gas from the airbag through the discharge valve. The members may be plates, cylinders or cones.

23 Claims, 10 Drawing Sheets

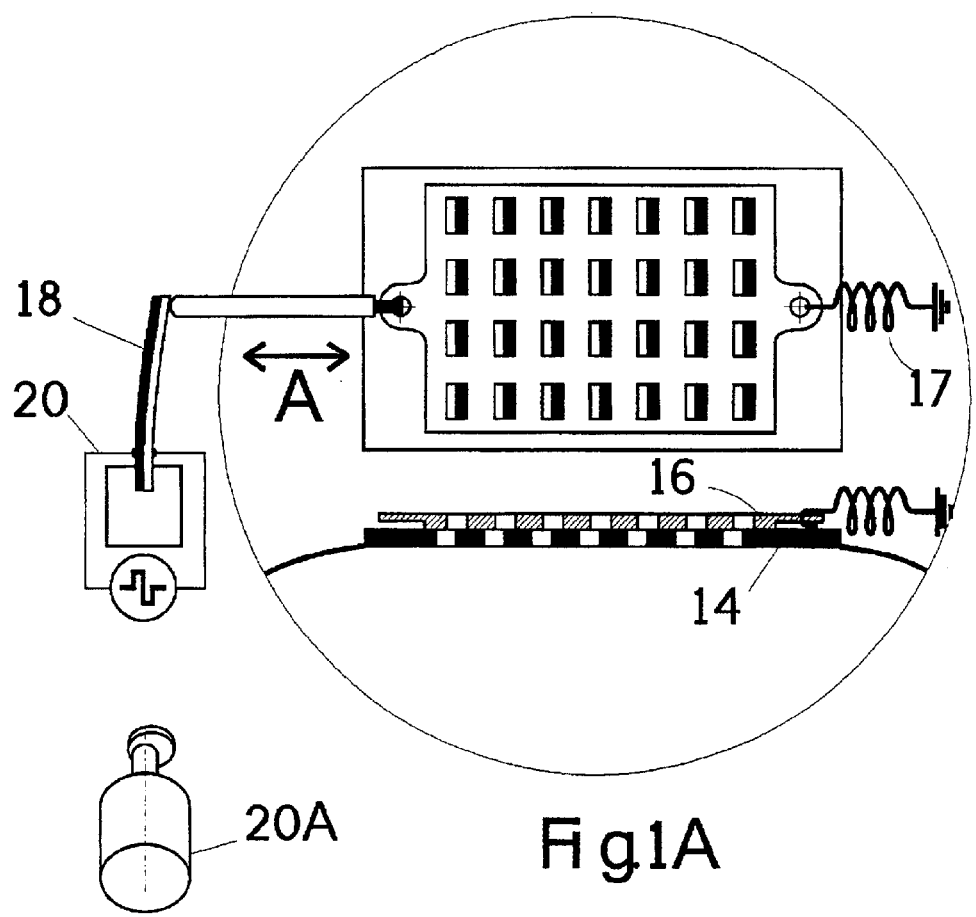
Fig.1A
Fig.1B
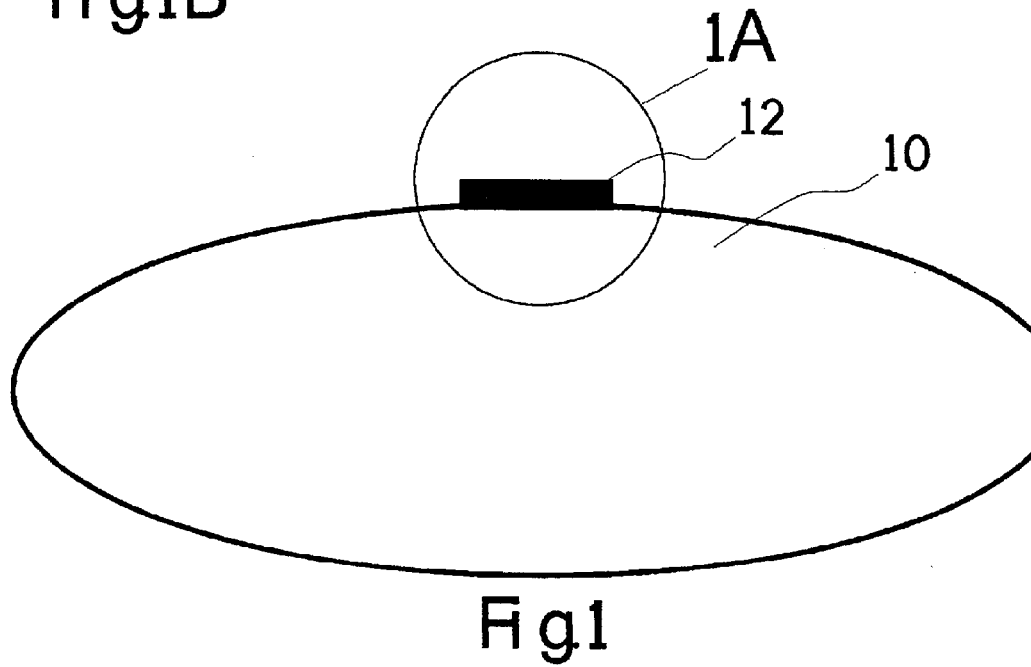
Fig.1

DISCHARGE VALVES FOR AIRBAGS AND AIRBAGS INCLUDING THE SAME

CROSS REFERENCE TO RELATED APPLICATION

This application claims the priority of U.S. provisional patent application Ser. No. 60/348,720 filed Oct. 23, 2001 under 35 U.S.C. §119(e).

FIELD OF THE INVENTION

This invention relates to valves for enabling the flow of gas from an airbag and more particularly, to valves capable of controlling the flow of gas out of an airbag.

The invention also relates to airbags including valves which enable control of outflow of gas from the airbags during or after inflation.

The invention also relates to control systems for controlling inflation and/or deflation of an airbag using discharge valves and more particularly, to control system which tailor the inflation and/or deflation to the properties of the occupant to be protected by the deploying airbag, e.g., the position, identification, morphology, type of the occupant.

BACKGROUND OF THE INVENTION

Prior art valves for possible use with airbags includes those described in U.S. Pat. Nos. 4,719,943 (Perach), and 5,855,228 (Perach), both of which are incorporated by reference herein.

Also, U.S. Pat. No. 5,653,464 (Breed et al.) discloses a variable vent hole for an airbag (FIGS. 7 and 7A). The variable vent is formed in a seam of the airbag and includes a hinged elastic member biased so that it tends to maintain the vent in a closed position. As pressure rises in the airbag, the vent is forced open. The vent contains an opening formed between a film layer of the airbag and a reinforcement member. The film layer is also sealed to the reinforcing member The flow of gas out of an airbag may be controlled during inflation and deflation of the airbag based on the morphology of the occupant for whom deployment of the airbag will be effective as disclosed in U.S. Pat. No. 5,822,707 (Breed et al.), incorporated by reference herein. This patent, as well as others assigned to the current assignee, further describes that the gas outflow may also be controlled based on other properties of the occupant to be protected by the deploying airbag including but not limited to the occupant's position, identification and type.

OBJECTS AND SUMMARY OF THE INVENTION

It is an object of the present invention to provide a new and improved discharge valve for an airbag.

It is another object of the present invention to provide a new and improved discharge valve for controlling flow of gas from an airbag.

It is yet another object of the present invention to provide a new and improved airbag including or incorporating a discharge valve which provides benefits over conventional airbag discharge valves.

It is still another object of the present invention to provide new and improved control systems for controlling inflation and/or deflation of an airbag using discharge valves and more particularly, to control systems which tailor the inflation and/or deflation to the properties of the occupant to be protected by the deploying airbag, e.g., the position, identification, type, morphology of the occupant.

It is another object of the invention to provide and new and improved valve which enables dynamic control of the flow of gas out of an airbag which is particularly useful in smart airbags.

In order to achieve at least one of the above objects, one embodiment of a discharge valve for an airbag in accordance with the invention comprises a fixed plate adapted to be arranged in connection with or associated with the airbag and having a pattern of openings and a movable plate arranged over the fixed plate and having a pattern of openings substantially identical to the pattern of openings of the fixed plate. The movable plate is movable relative to the fixed plate to vary the correspondence between the openings on the movable plate and the openings in the fixed plate to thereby vary valve openings defined by the fixed plate and the movable plate. Variation in the valve openings results in control and/or regulation of the outflow of gas from the airbag through the discharge valve.

Instead of a movable plate and a fixed plate, a pair of concentric cylinders could be used having substantially identical patterns of openings. One cylinder would be rotated or stroked relative to the fixed cylinder to modulate the openings. The fixed cylinder could be the internal cylinder or the external cylinder.

In another embodiment, instead of plates or cylinders, a pair of cones could be used having substantially identical patterns of openings. One cone would be rotated or stroked up and down relative to the fixed cone to modulate the openings. The fixed cone could be the inner cone or the outer cone.

Thus, in general, any two members may be used in the invention, one movable relative to the other. The member may be a plate, cylinder or cone, or possibly have other forms.

Other possible features of this embodiment includes a spring connected to the movable member for allowing movement of the movable member and a movement mechanism for moving the movable member relative to the fixed member. The movement mechanism may comprises a piezo-electric bi-morph crystal arrangement arranged in connection with the movable member for modulating the movable member to thereby control the valve openings. The piezo-electric crystal arrangement can be driven by a drive signal and associated electronics. When present, the spring is connected to an opposite side of the movable member from the piezo-electric crystal arrangement. The movement mechanism can also comprise an inductive solenoid motion or motor arrangement with a cam offset.

Another embodiment of a discharge valve for an airbag comprises a diaphragm composed of foil and including concentric grooves and a mechanism for weakening at least one of the grooves whereby the diaphragm is severable along the groove(s) upon exertion of pressure. The foil may be metallic or another type of material which is meltable upon application of an electric current. The mechanism to weaken the grooves may therefore be the creation of one or more electric circuit, such as a capacitive discharge circuit. A high impedance is formed at the grooves by reducing the cross sectional area. This creates a high resistance at the groove thus causing thermal melting of the groove and/or grooves. A logic circuit may be provided to determine to which circuit a signal is fed to cause weakening of the associated groove(s). The logic circuit can be designed to consider properties of an occupant to be protected by the airbag Another embodiment of a discharge valve for an airbag in accordance with the invention comprises a flexible diaphragm adapted to be fixed to the airbag and having apertures therein. The diaphragm is made of elastic material such as from one or more elastomers. The diaphragm is adapted to be fixed by its edges to the airbag and can be circular. When the elastomer expands, the apertures in the elastomer also expand thereby increasing the discharge rate.

Still another embodiment of a discharge valve for an airbag in accordance with the invention comprises a fixed disk adapted to be arranged in connection with or associated with the airbag and including apertures, a movable disk mounted over the fixed disk and including solid sections and open sections, and an arm connected to the movable disk. The arm is movable to vary correspondence between the apertures in the movable disk and the apertures in the fixed disk to thereby vary valve openings defined by the fixed disk and the movable disk.

Other features of this embodiment include a mounting pin for rotatably mounting the movable disk to the fixed disk and a movement mechanism for moving the arm. The movement mechanism may comprises a solenoid, bi-morph piezoelectric element, ferro-magnetic arrangement or drive or a thermal-based arrangement such as a phase change metal.

Yet another embodiment of a discharge valve for an airbag in accordance with the invention comprises a valve seat adapted to be arranged in connection with the airbag, a valve member engaging with the valve seat to selectively close at least one passage defined between the valve seat and the valve member, and a valve spring arranged to provide a biasing force to press the valve member against the valve seat to close the passage(s).

In another embodiment of a discharge valve for an airbag in accordance with the invention, the discharge valve comprises a substrate having at least three spiral cuts arranged to form cantilevered arms capable of deflecting under pressure. The spiral cuts extend from a peripheral edge of the substrate to an interior region of the substrate.

Another substrate of a discharge valve may comprise cuts defining cantilevered arms capable of deflecting under pressure. The cuts define cantilevered arms, and possibly a central region with the cantilevered arms connecting the central region to a peripheral edge of the substrate. In the latter case, the central region is deflected from a plane of remaining portions of the substrate upon deflection under pressure. The cantilevered arms could form a very non-linear force profile that could mechanically modulate the discharge rate.

BRIEF DESCRIPTION OF THE DRAWINGS

The following drawings are illustrative of embodiments of the invention and are not meant to limit the scope of the invention as encompassed by the claims.

FIG. 1 is a sketch of a first embodiment of a valve in accordance with the invention;

FIG. 1A is an enlarged view of the portion designated 1A in FIG. 1;

FIG. 1B is an alternative actuating device for the embodiment shown in FIG. 1A;

DETAILED DESCRIPTION OF PREFERRED EMBODIMENTS

Figures 2A, 2B:
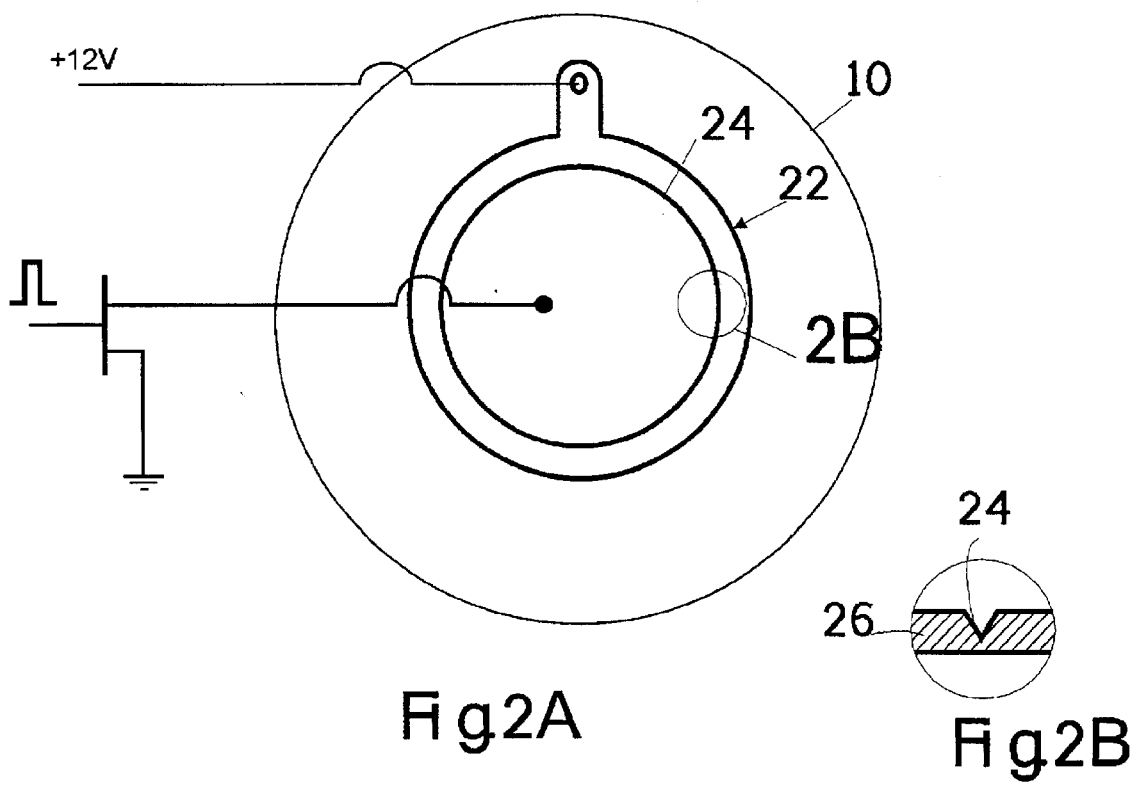
FIG. 2A is a top view of the embodiment shown in FIG. 2.
FIG. 2B is an enlarged view of the portion designated 2B in FIG. 2A.

Referring now to the drawings wherein the same reference numerals refer to like elements, FIG. 1 shows an airbag 10 equipped with a discharge valve 12 in accordance with a first embodiment of the invention. The discharge valve 12 is interposed between the gas-filled interior of the airbag and an atmosphere exterior of the airbag 10 so as to enable gas or other fluid from the airbag to the outlet from the interior of the airbag to the exterior atmosphere.

The airbag 10 may be any airbag arranged on or in a vehicle, including but not limited to, a frontal airbag, a side airbag, a knee bolster and an externally deployed airbag.

As shown in FIG. 1A, discharge valve 12 comprises a fixed, bottom plate 14 arranged in connection with or associated with the airbag 10, e.g., on an outer layer of the material of the airbag or arranged in conjunction with the inflator or inflation means, and has a pattern of openings. A top plate 16 is arranged over the bottom plate 14 and is movable relative to the bottom plate 14. Top plate 16 has the same pattern of openings as the bottom plate 14. Top plate 16 is mounted to a fix component in the vehicle by a spring 17 to allow for movement relative to the bottom plate 14 to thereby vary the correspondence between the openings in the top plate 16 and the bottom plate 14.

When the phrase "pattern of openings" is used to refer to the arrangement of openings in the bottom plate 14 and top plate 16, it must be understood that the openings are not required to be arranged in any discernible or specific geometric pattern. Rather, the pattern may simply be the overall arrangement of the openings.

Gas from the airbag 10 flows through the openings in the bottom plate 14 and then through the openings in the top plate 16 with the volume and/or flow rate of the gas being determined by the degree of correspondence between the openings in the top plate 16 and the openings in the bottom plate 14. That is, in a maximum gas outflow position, the top plate 16 will be in a position so that openings in the top plate 16 correspond exactly with the openings in the bottom plate 14. On the other hand, in a minimum gas outflow position, the top plate 16 will be in a position so that the openings in the top plate 16 will over lie solid portions of the bottom plate 14. Any position between these extreme positions is also possible so that the gas outflow rate is controlled by the variable position of the top plate 16 relative to the bottom plate 14.

A movement mechanism is provided to move the top plate 16 relative to the bottom plate 14 and is generally effective to move the top plate 16 to multiple positions relative to the bottom plate 14 and for variable, adjustable durations. That is, the top plate 16 can be moved from one position to another position during the discharge of gas from the airbag 10 to vary the outflow of gas during the discharge. The movement of the top plate 16 and timing of the movement of the top plate 16 may be controlled by an appropriate control system to obtain the desired outflow rate, duration and/or volume of gas from the airbag 10. The control system can be designed to consider the properties of the occupant to be protected by the airbag 10, e.g., the occupant's position, morphology, type and identification.

One embodiment of the movement mechanism comprises a piezo-electric bi-morph crystal arrangement 18 which shakes the top plate 16 back and forth (in the direction of arrow A) to thereby modulate the valve openings defined by the openings in the bottom plate 14 and top plate 16. The piezo-electric crystal 18 is driven by a drive signal and associated electronics 20. The electronics 20 can be connected to or incorporated into a vehicle occupant sensor capable of determining an optimum discharge rate of the airbag 10 so that the top plate 16 is moved to achieve the optimum discharge rate.

Another movement mechanism could be an inductive actuator or motor arrangement with a cam offset (represented by motor 20A in FIG. 1B). In this case, the motion could be started during a pre-crash period and engaged with a magnetic clutch or piezo-electric clutch thereafter. A motor can also be used which is offset by the pitch of the openings and thereby achieve the possibility of regulating the valve openings defined by the openings in the top plate 16 and fixed plate 14.

Figure 2:
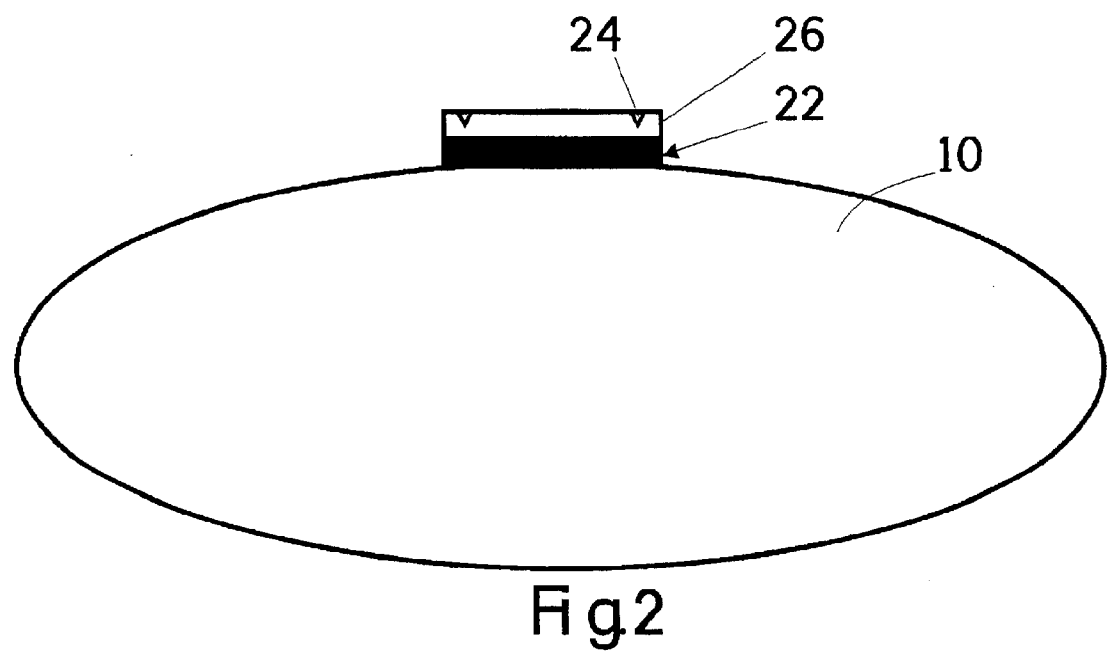
FIG. 2 is a sketch of a second embodiment of a valve in accordance with the invention.

Referring now to FIG. 2, another embodiment of a discharge valve is shown designated generally at 22. In this embodiment, an indent or groove 24 is formed in a metal foil diaphragm 26 in a peripheral surface of the airbag 10 (see FIG. 2A), or in a surface against which the pressure in the airbag 10 is effective. A signal is fed to a circuit formed by the groove 24 so that there is a large impedance ($I^2R$) drop across the groove that melts the metal foil and thereby weakens the diaphragm 26. The pressure of the gas in the airbag 10 will then cause the weakened region to break and open a passage between the interior of the airbag 10 and the exterior. A 12 V firing signal may be preferably used.

Several grooves can be provided on the metal foil diaphragm 26 to enable different size openings to be formed. Instead of metal foil, the diaphragm may be made of any material which melts upon the formation of an electric circuit. The grooves 24 can be annular and concentric.

When multiple annular grooves or rings 24 are provided, with an associated circuit formed for each groove 24, a signal can be sent to a particular circuit to cause an opening having a pre-determined size to be formed, i.e., the weakened region will be at a set diameter from a center of the diaphragm 26. In this manner, a logic input can be used to determine what size opening is needed to provide for a controlled, appropriate discharge and then generate a signal to cause the annular groove 24 which will provide for that size opening to weaken and subsequently break upon exertion of the pressure from the gas in the airbag 10.

Figure 3A:
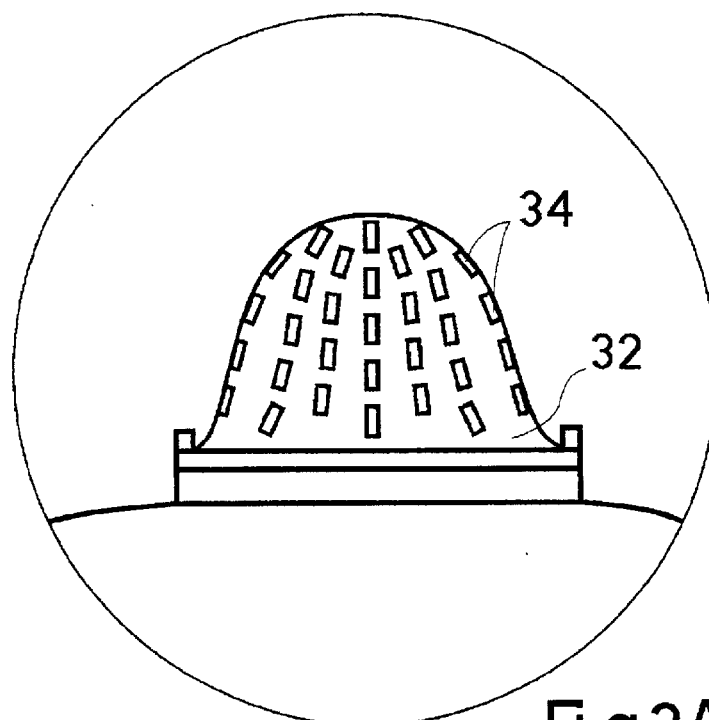
FIG. 3A is an enlarged view of the portion designated 3A in FIG. 3.
Figure 3:
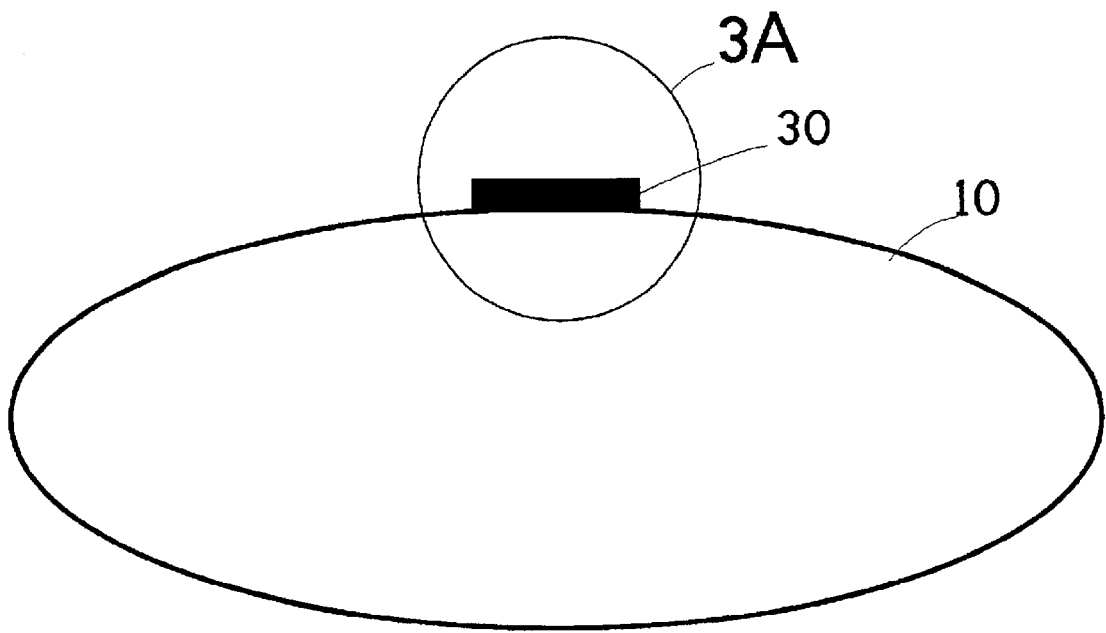
FIG. 3 is a sketch of a third embodiment of a valve in accordance with the invention.

Referring now to FIGS. 3 and 3A, another embodiment of a discharge valve is shown. In this embodiment, the discharge valve 30 comprises an elastomer diaphragm 32 with apertures 34 therein. In a rest condition, the diaphragm 32 is flat and the apertures 34 are relatively small. However, when pressure is applied, the diaphragm 32 expands to the condition shown in FIG. 3 and the apertures 34 become larger. Gas from the interior of the airbag 10 flows to the exterior through the enlarged apertures 34. The expansion of the diaphragm 32 depends on the magnitude of the pressure of the gas in the airbag 10.

The edges of the diaphragm 32 are preferably fixed relative to the airbag 10 and may even be attached to the airbag 10. For example, the edges of the diaphragm 32 may be attached to the outer material layer of the airbag 10.

Control of the flow rate and/or volume of gas from the airbag 10 can be achieved through appropriate determination of the size and/or number of the apertures 34.

The material from which the diaphragm 32 is made is preferably pre-stretched and then die cut. Instead of an elastomer, other resilient and/or flexible materials may be used.

Figure 4B:
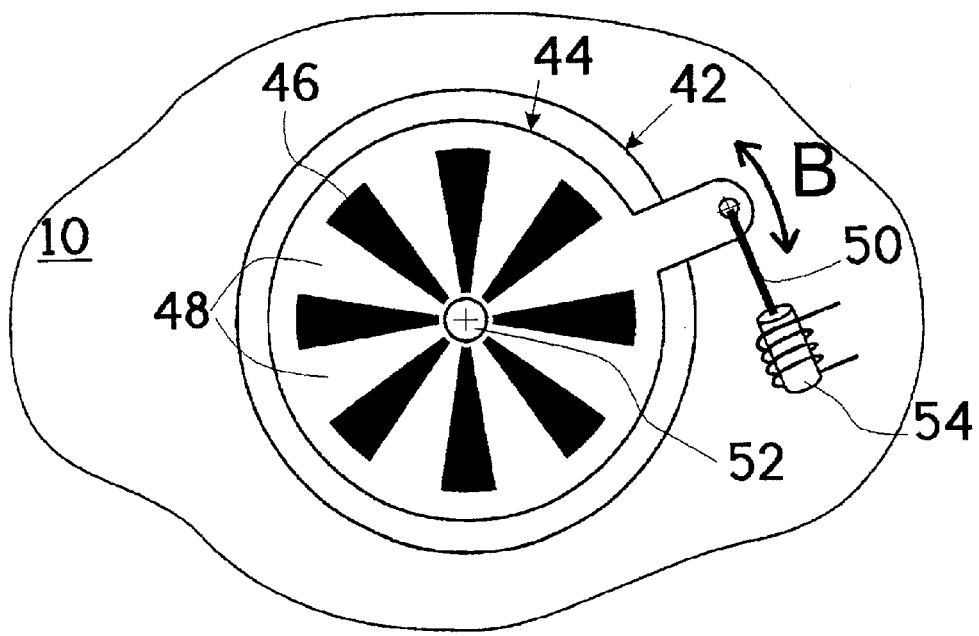
FIG. 4B is a top view of the embodiment shown in FIG. 4.
Figure 4A:
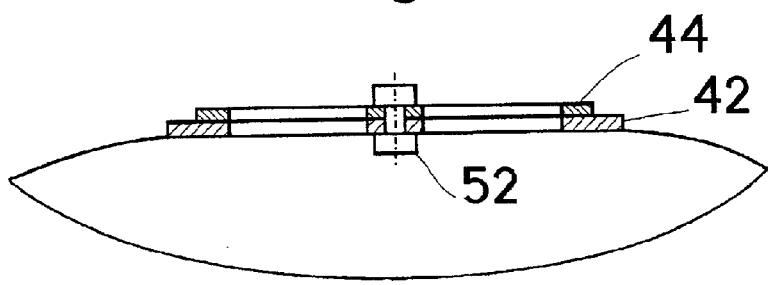
FIG. 4A is a partial cross-sectional view of the embodiment shown in FIG. 4.
Figure 4:
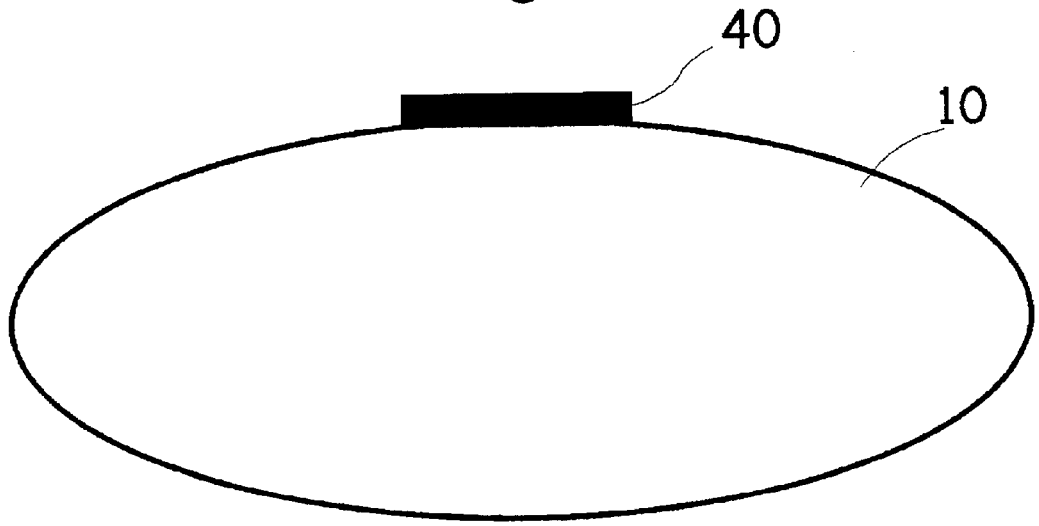
FIG. 4 is a sketch of a fourth embodiment of a valve in accordance with the invention.

Referring now to FIGS. 4, 4A and 4B, in this embodiment, a discharge valve for an airbag is represented generally at 40. The discharge valve includes a fixed apertured disk 42 arranged in connection with or associated with the airbag 10 and a movable apertured disk 44 mounted over the fixed disk 42. Movable disk 44 has alternating solid sections 46 and open sections 48 and is connected to an arm 50. The center of disk 44 is mounted through the fixed disk 42 by a mounting pin 52, although this mounting arrangement can be eliminated and other means for mounting the movable disk 44 relative to the fixed disk 42 employed in the invention. Arm 50 is associated with a rotation mechanism 54 to enable the arm 50 to be moved in the directions of arrow B. Movement of the arm 50 results in movement of the movable disk 44 relative to the fixed disk 42 so that the correspondence between the apertures in the fixed disk 42 and the apertures in the movable disk 44 is varied (to thereby adjust valve openings defined by the apertures in the fixed disk 42 and movable disk 44). This variation enables the discharge flow to be controlled.

The rotation mechanism 54 may be a solenoid, bi-morph piezo-electric element, ferro-magnetic arrangement or drive, ferro-electric arrangement or drive or a thermal-based arrangement, e.g., a phase change metal. That is, almost any type of controllable mechanism for moving the arm 50 can be used in the invention. When a solenoid is used, application of alternating electrical current causes forward and reverse motions of the arm 50.

Figure 5B:
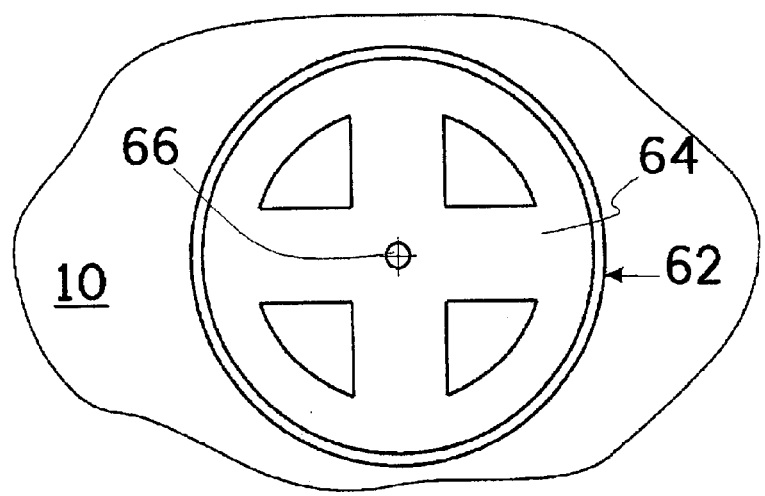
FIG. 5B is a top view of the embodiment shown in FIG. 5.
Figure 5A:
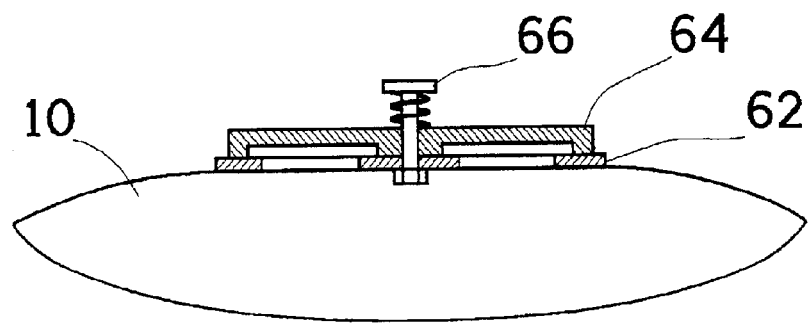
FIG. 5A is a partial cross-sectional view of the embodiment shown in FIG. 5.
Figure 5:
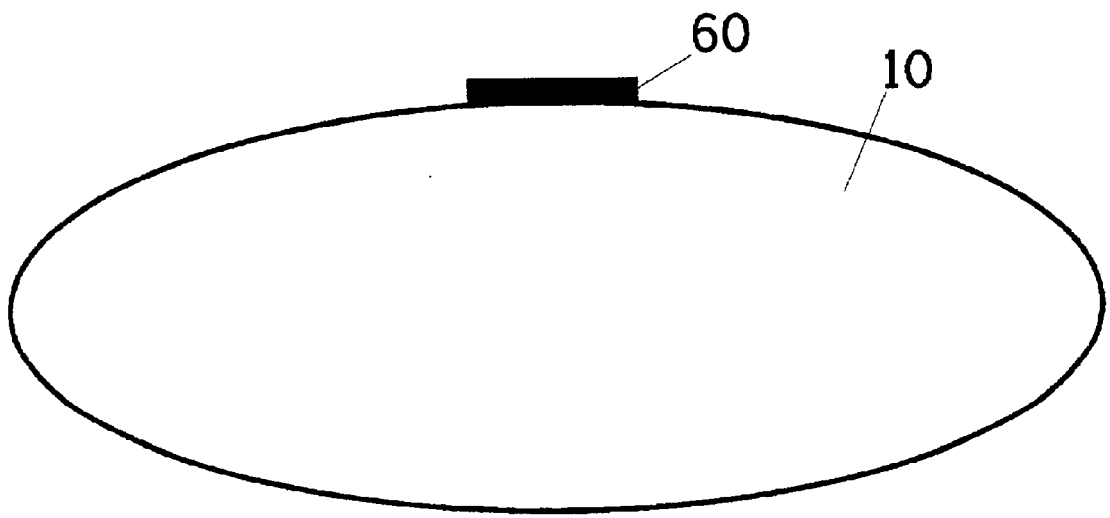
FIG. 5 is a sketch of a fifth embodiment of a valve in accordance with the invention.

FIGS. 5, 5A and 5B show another embodiment of a discharge valve in accordance with the invention and is designated generally at 60. Discharge valve 60 includes a valve seat 62 formed in connection with or associated with the airbag 10 and arranged to enable flow of gas from the interior of the airbag 10 therethrough. A valve member 64 engages with the valve 62 and a valve spring 66 is arranged to provide a biasing force to press the valve member 64 toward the airbag 10 to close the opening(s) formed by the valve seat 62 and valve member 64.

Figure 6B:
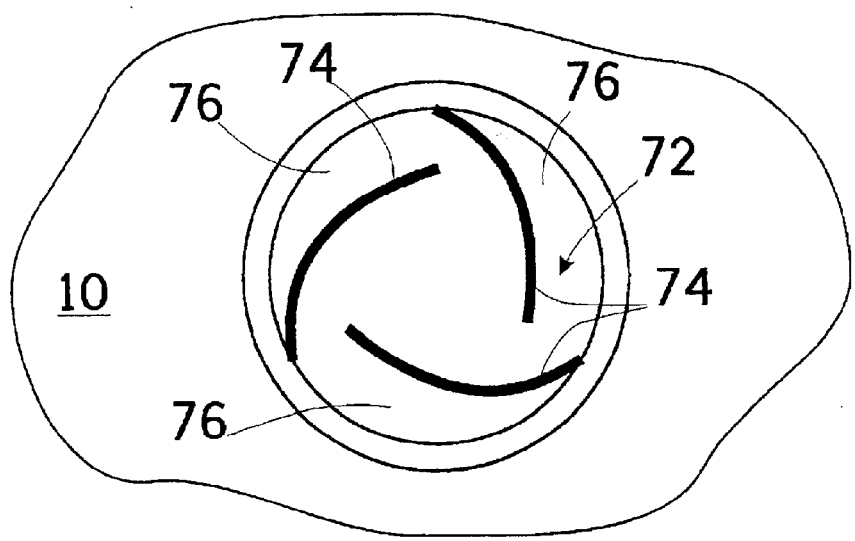
FIG. 6B is a top view of the embodiment shown in FIG. 6.
Figure 6A:
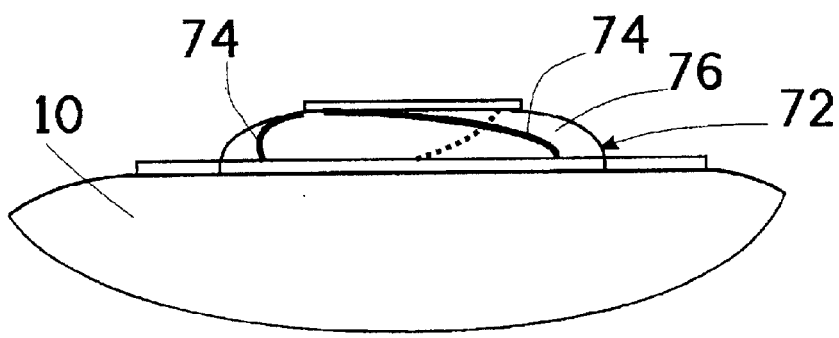
FIG. 6A is a partial cross-sectional view of the embodiment shown in FIG. 6.
Figure 6:
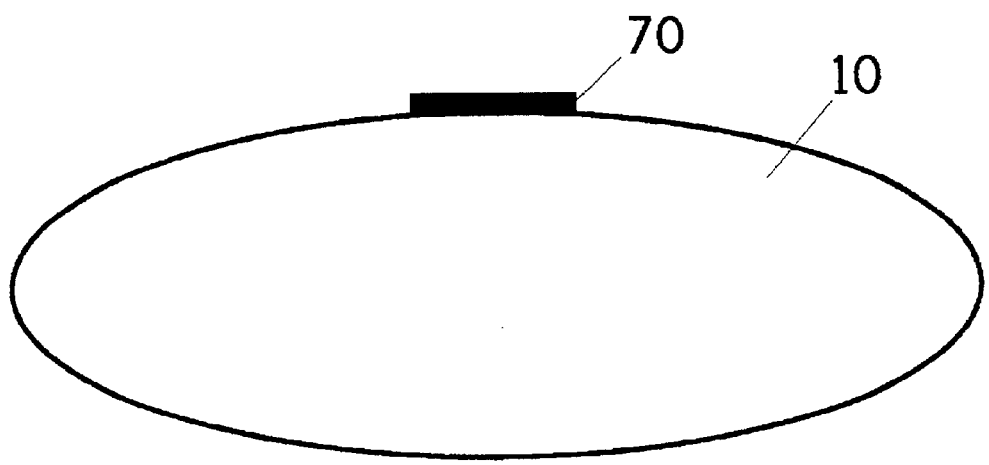
FIG. 6 is a sketch of a sixth embodiment of a valve in accordance with the invention.

FIGS. 6, 6A and 6B show another embodiment of a discharge valve for an airbag in accordance with the invention and is designated generally at 70. Discharge valve 70 includes a substrate 72 having three or more spiral cuts 74 arranged to form cantilevered arms 76 that will deflect under pressure. The cantilevered arms 76 may be die cut into the material of the airbag 10. Multiple spiral arms thus form a plurality of springs. In operation, the pressure of the gas in the interior of the airbag 10 will urge the arms 76 upward as shown in FIG. 6 thereby opening the cuts to form passages at the locations of the cuts 74.

Instead of die cutting the cantilevered arms 76 into the material of the airbag 10, a dedicated diaphragm may be provided in connection with an outer material layer of the airbag 10 and cuts made in this diaphragm.

Figure 7B:
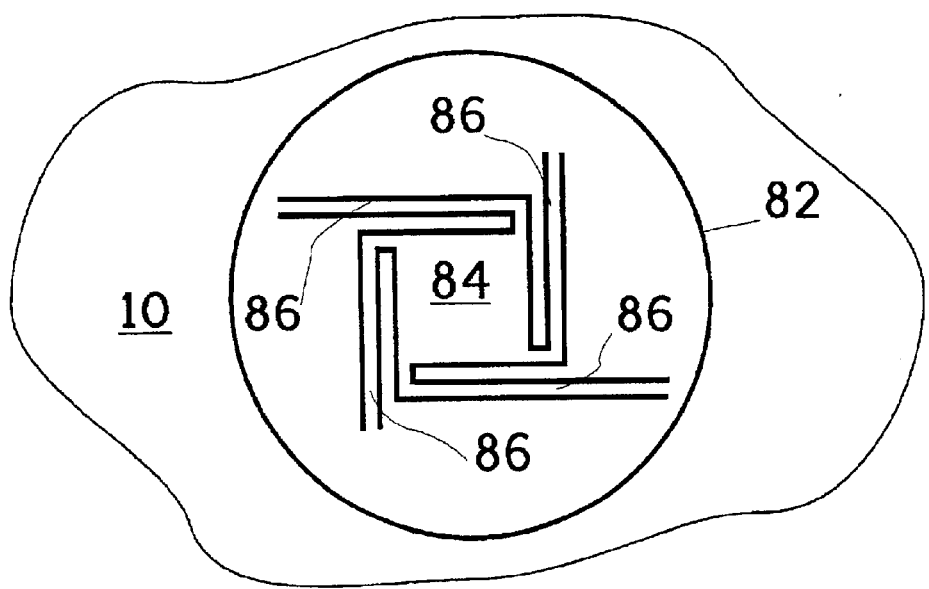
FIG. 7B is a top view of the embodiment shown in FIG. 7.
Figure 7A:
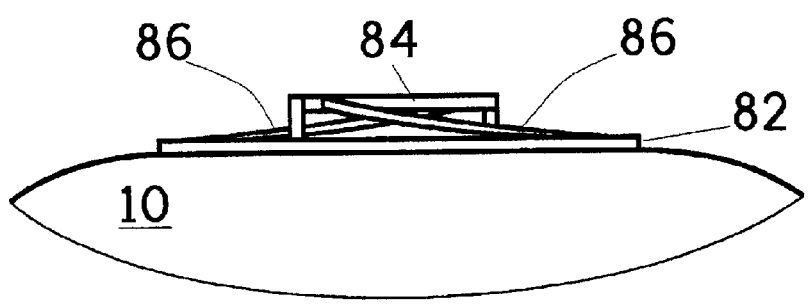
FIG. 7A is a partial cross-sectional view of the embodiment shown in FIG. 7.
Figure 7:
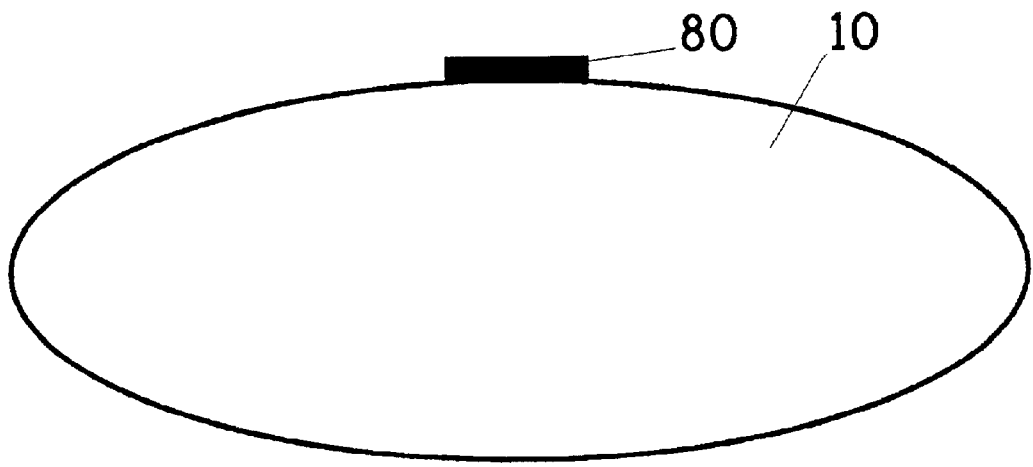
FIG. 7 is a sketch of a seventh embodiment of a valve in accordance with the invention.

FIGS. 7, 7A and 7B show another embodiment of a discharge valve for an airbag in accordance with the invention and is designated generally at 80. Discharge valve 80 includes a substrate 82 cut in a specific manner to define a square cantilevered spring matrix having a central region 84 and cantilevered arms 86 that will deflect under pressure. The cantilevered arms 86 may be die cut into the material of the airbag 10. Multiple spiral arms thus form a large spring valve. In operation, the pressure of the gas in the interior of the airbag 10 will urge the arms 86 upward as shown in FIG. 7 thereby raising the central region 84 and opening passages between the interior of the airbag 10 and the exterior.

Instead of die cutting the cantilevered arms 86 into the material of the airbag 10, a dedicated diaphragm may be provided in connection with an outer material layer of the airbag 10 and cuts made in this diaphragm.

Figure 8A:
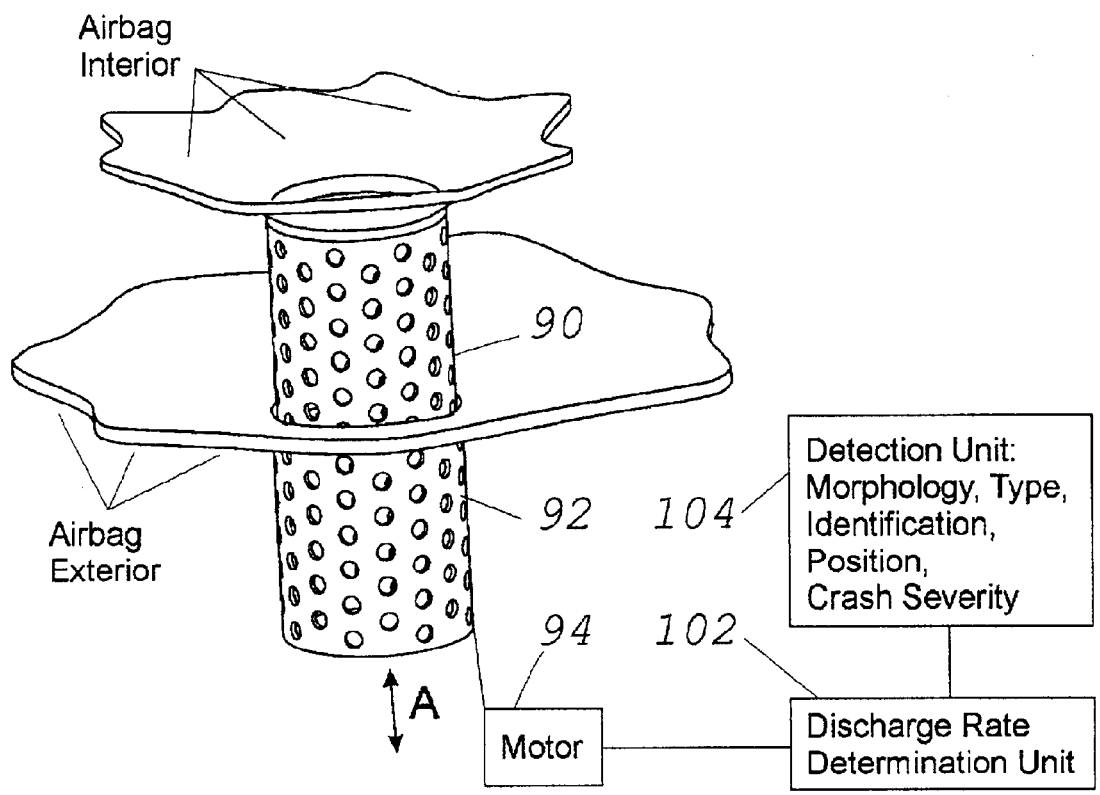
FIGS. 8A and 8B are sketches of variations of a valve in accordance with the invention showing the use of a cylinder valve.
Figure 8B:
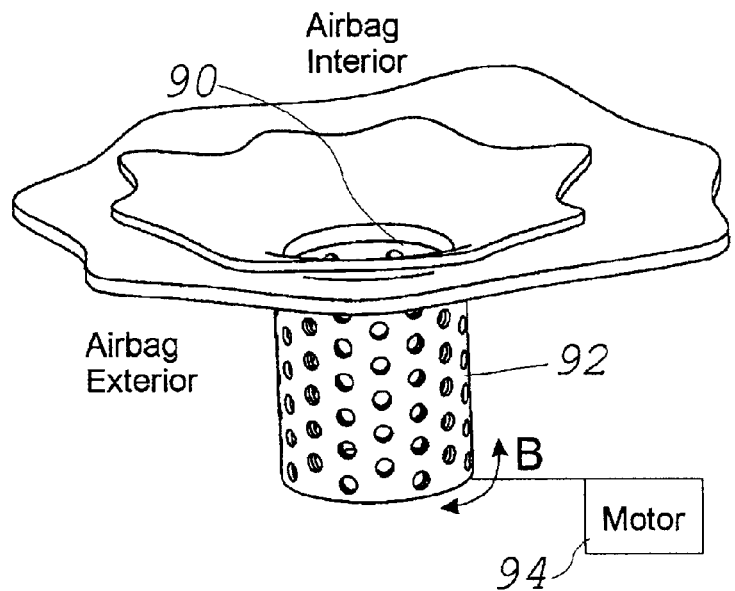

Referring now to FIGS. 8A and 8B, instead of plates having a pattern of openings interposed between the airbag interior and airbag exterior, a pair of cylinders could be used.

As shown in FIGS. 8A and 8B, an inner cylinder 90 has a pattern of openings and is positionable inside an outer cylinder 92 such that the pattern of openings in the outer cylinder 92 are in alignment with the pattern of openings in the inner cylinder 90. Outer cylinder 92 is coupled to a motor 94 or other actuating device for moving the outer cylinder 92 in a stroked manner in the direction of arrow A, in which case, the outer cylinder 92 is moved up and down relative to the inner cylinder 90 (FIG. 8A). The pattern of openings in the inner cylinder 90 may completely align with the pattern of openings in the outer cylinder 92 when the outer cylinder 92 is fully in the up position.

The motor 94 is controlled by a gas discharge rate determination unit 102, e.g., a processor containing an algorithm relating the desired gas discharge rate to the required action of the motor 94 to move the outer cylinder 92 to provide for the desired gas discharge rate. Such an algorithm may be determined experimentally or empirically. The gas rate determination unit 102 is provided with or determines the desired gas discharge rate through input from a detection unit 104 which detects, measures or determines the morphology of the occupant to be protected by the airbag, the type of occupant, the identification of the occupant, the position of the occupant and/or the severity of the crash. Any of these factors, or combinations of these factors, may be used in the determination of the discharge rate to optimally protect the occupant in a crash. The discharge rate determination unit 102 and detection unit 104 may be used in any of the embodiments described herein.

As shown in FIG. 8B, a motor or other actuating device 94 may rotate the outer cylinder 92 in the direction of arrow B relative to the inner cylinder 90, in which case, the inner cylinder 92 is situated within the outer cylinder 92. The openings in the outer cylinder 92 may align fully with the openings in the inner cylinder 90 (in which case the valve is in the full discharge position) or align with material between the openings in the inner cylinder 90 (in which case the valve is in the full blocked-discharge position). Between these extreme positions is a wide range of variations in the discharge of the gas in the airbag.

Instead of having the outer cylinder 92 move relative to the inner cylinder 90, the reverse situation could also be used, i.e., move the inner cylinder relative to the stationary outer cylinder, in which case, the outer cylinder would be fixed to the airbag since the stationary cylinder is preferably fixed to the airbag. Also, as shown, the airbag interior is on the side of the outer cylinder 92 and the airbag exterior is on the side of the inner cylinder 90 so that gas is discharged from the airbag first through the openings in the outer cylinder 92 and then through the openings in the inner cylinder 90. The reverse situation could also be used. Thus, in general, the set of openings of one cylinder is in flow communication with the interior of the airbag and the set of openings in the other cylinder is in flow communication with the exterior of the airbag so that the degree of registration or alignment between the openings determines the discharge rate of gas from the airbag.

Figure 9A:
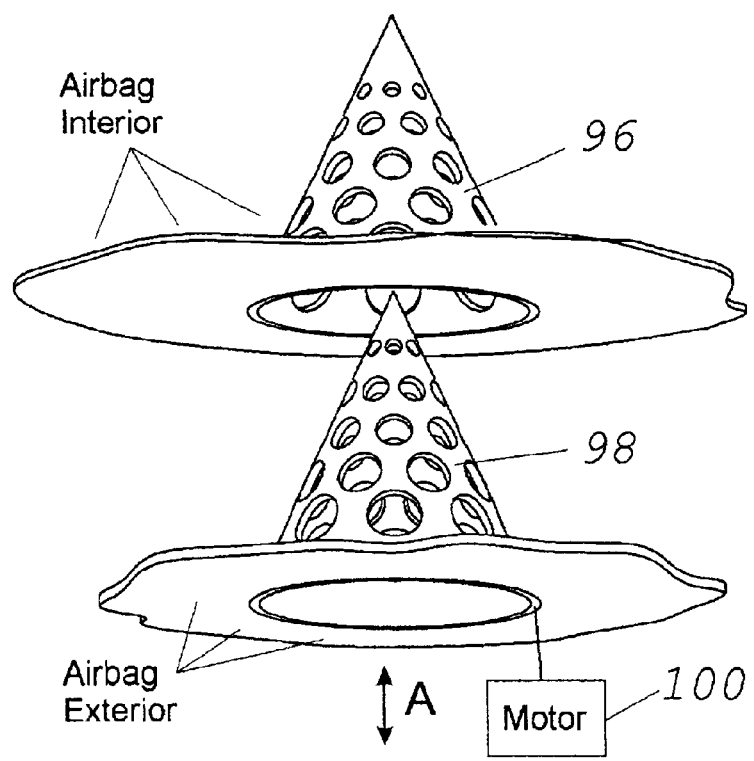
FIGS. 9A and 9B are sketches of variations of a valve in accordance with the invention showing the use of a cone-shaped.
Figure 9B:
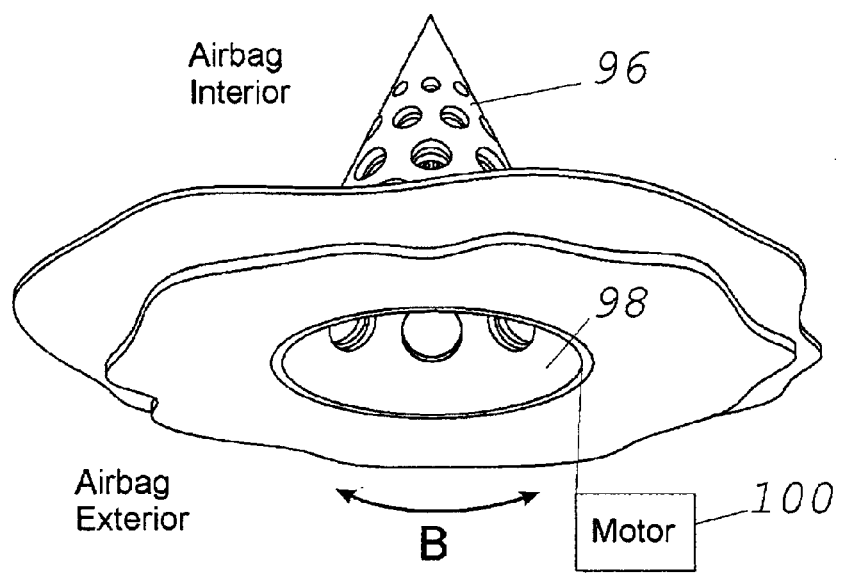

Referring now to FIGS. 9A and 9B, instead of plates or cylinders having a pattern of openings interposed between the airbag interior and airbag exterior, a pair of cones could be used.

As shown in FIGS. 9A and 9B, an inner cone 98 has a pattern of openings and is positionable inside an outer cone 96. Inner cone 98 is coupled to a motor 100 or other actuating device for moving the inner cone 98 in a stroked manner in the direction of arrow A, in which case, the inner cone 98 is moved up and down relative to the outer cone 96 (FIG. 8A). The pattern of openings in the inner cone 98 may completely align with the pattern of openings in the outer cone 96 when the inner cone 98 is fully in the up position.

In the alternative, as shown in FIG. 9B, the motor or other actuating device 94 may rotate the inner cone 98 in the direction of arrow B relative to the outer cone 96, in which case, the inner cone 98 is situated almost entirely within the outer cone 96. The openings in the inner cone 98 may align fully with the openings in the outer cone 96 (in which case the valve is in the full discharge position) or align with material between the openings in the outer cone 96 (in which case the valve is in the full blocked-discharge position). Between these extreme positions is a wide range of variations in the discharge.

Instead of having the inner cone 98 move relative to the outer cone 96, the reverse situation could also be used, i.e., have the outer cone move relative to the inner cone, in which case, the inner cone would be fixed to the airbag since the stationary cone is preferably fixed to the airbag. Also, as shown, the airbag interior is on the side of the outer cone 98 and the airbag exterior is on the side of the inner cone 98 so that gas is discharged from the airbag first through the openings in the outer cone and then through the openings in the inner cone. The reverse situation could also be used. Thus, in general, the set of openings of one cone is in flow communication with the interior of the airbag and the set of openings in the other cone is in flow communication with the exterior of the airbag so that the degree of registration or alignment between the openings determines the discharge rate of gas from the airbag.

The discharge valves described above can be used individually or in combination in a single airbag. To the extent possible, the discharge valves can also be connected and controlled by a control system which tailors the outflow rate through the discharge valve to the properties of the occupant. That is, an occupant sensor is provided in the vehicle to measure or determine one or more properties of an occupant and then the control system considers the measured or determined properties when determining the desired, optimum gas outflow rate and controls the discharge valve accordingly. The control system may also consider the properties of the crash as determined by one or more crash sensors and associated circuitry. Such properties include the velocity change of the crash, the acceleration of the crash and the direction of impact.

The examples shown generally illustrate the placement of the valve in association with the fabric of the airbag, i.e., at a location on or against the fabric of the airbag over a discharge opening different from the inlet opening of the airbag which is coupled to the inflator structure or inflation means of the airbag. Alternately, the valve can be placed on other structure that is in fluid communication with the interior of the airbag. Such structure can be part of, for example, the inflator structure or inflation means of the airbag.

Figure 10:
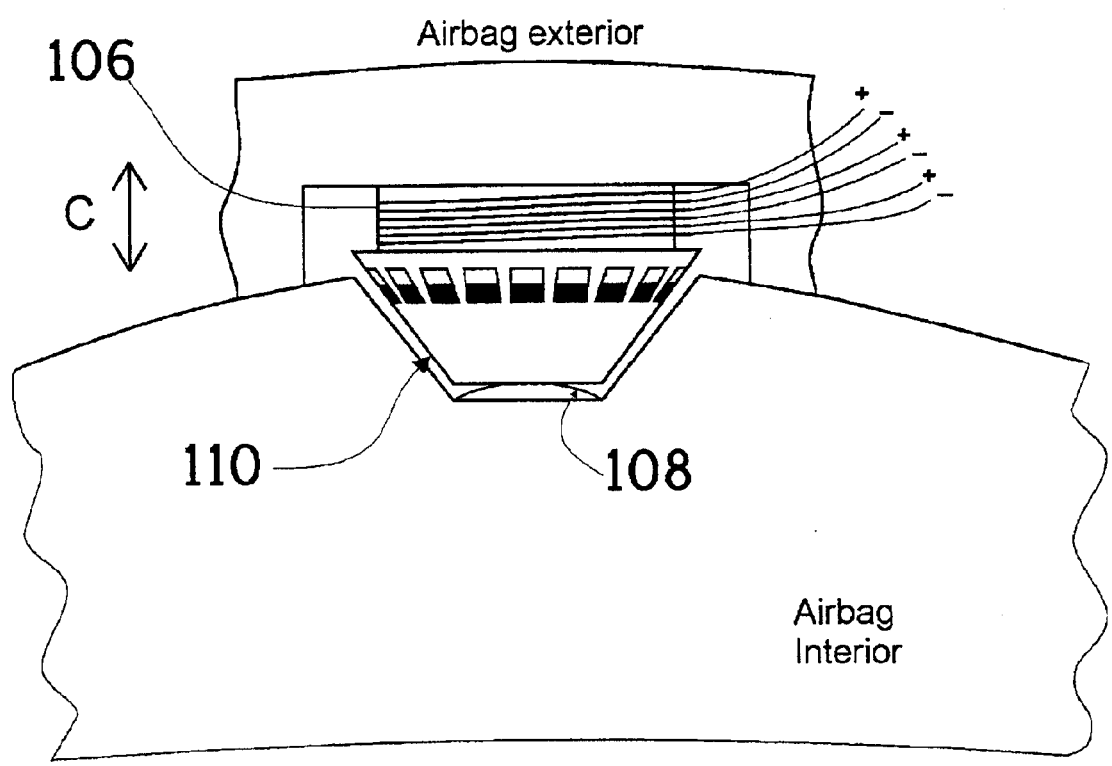
FIG. 10 is a illustration of a discharge valve including stacked drive elements.

With respect to the drive elements which move one member having openings relative to another, e.g., a plate, cylinder and cone, stacked drive elements could be used. That is, as shown in FIG. 10, a stack of piezoelectric, ferroelectric or phase change alloy elements 106 may be used to provide a short stroke with a high modulation force and milli-second response time. In this case, when voltage is applied, the stack 106 expands and contracts to module an air gap 110 between the airbag interior and airbag exterior. Also, to increase response time into the milli-second range, a high force pre-load with a mechanical spring 108 and an escarpment mechanism for triggering the discharge valve could be used. A popit-type valve that uses the available air pressure to obtain gain over a single stage valve may be also be used in accordance with the invention.

Any of the valves described in International Patent Publication No. PCT/RU02/00225, incorporated by reference herein, could also be used in accordance with the invention in its various forms. This, publication, incorporated by reference herein, describes a safety device installed inside a vehicle having an inflatable airbag having an inlet for receiving gas filling the airbag to its ready state, and a system for supplying gas to the airbag, including a gas source, a valve device, and a triggering unit. The valve device is formed by a pneumatic distributor having two stable positions: an open position wherein gas from the gas source is fed to the airbag through its inlet, and a closed position wherein the gas flow through the airbag inlet is interrupted.

Although multiple embodiments of discharge valves are described above, features of each can be used in the other embodiments. Also, a vehicle can be manufactured with different discharge valves for different airbags. Airbags including any of the discharge valves described above, or any combinations of the discharge valves described above, are also within the purview of the invention.

The discharge valve of an airbag in accordance with the invention can be controlled based on any number of criteria, including but not limited to the morphology of the occupant to be protected by the airbag (e.g., weight, height, etc.), the position of the occupant (either the current position or an extrapolated future position at which the occupant will be at the time of airbag deployment), the severity of the crash requiring airbag deployment, the type of occupant (i.e., adult, occupied or unoccupied child seat, rear-facing child seat, front-facing child seat, child, pet, etc.), the direction of the crash, the position of the seat or any part thereof, the identification of the occupying items in the vehicle. These criteria may be used individually or in combination. To determine the appropriate control of the gas discharge rate of the airbag.

The gas discharge rate of the airbag is controlled by controlling the motor or other actuating device. To this end, the operation of the motor is studied to determine the degree of alignment of the openings in the movable member and the fixed member and thus the gas flow through the openings, if any, for different positions of the movable plate. Then, in operation, the motor is controlled to move the plate in the required manner to provide for the desired gas discharge rate.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

We claim:

1. In an airbag system including an airbag having an inlet opening and an inflator for inflating the airbag by directing fluid into an interior of the airbag through the inlet opening, the improvement comprising:
   a discharge valve arranged apart from the inflator and including
      a fixed member arranged against an outer layer of said sheet of material and having apertures communicating with said interior; and
      a movable member having open sections and solid sections,
      said movable member being movable relative to and alongside said fixed member to vary the correspondence between said apertures in said movable member and said open sections in said fixed member to thereby vary valve openings defined by said fixed member and said movable member.

2. The airbag system of claim 1, further comprising a movement mechanism for moving said movable member relative to said fixed member.

3. The airbag system of claim 2, wherein said movement mechanism comprises a piezo-electric bi-morph crystal arrangement arranged in connection with said movable member for shaking said movable member to thereby modulate the valve openings.

4. The airbag system of claim 3, wherein said piezoelectric crystal arrangement is structured and arranged to be driven by a drive signal and associated electronics.

5. The airbag system of claim 1, wherein said movable member and said fixed member are plates.

6. The airbag system of claim 1, wherein said fixed member is a substantially circular disk and said movable member is a substantially circular disk.

7. The airbag system of claim 6, further comprising an arm connected to said movable disk, said arm being movable to vary the correspondence between said opening in said movable disk and said apertures in said fixed disk.

8. The airbag system of claim 7, further comprising a movement mechanism for moving said arm.

9. The airbag system of claim 6, further comprising a mounting pin for rotatably mounting said movable disk to said fixed disk.

10. The airbag system of claim 1, wherein said fixed member is attached around its periphery to said outer layer of said sheet of material.

11. In an airbag system including an airbag having an inlet opening and an inflator for inflating the airbag by directing fluid into an interior of the airbag through the inlet opening, the improvement comprising:

a discharge valve arranged apart from the inflator and including
a fixed disk arranged against an outer layer of said sheet of material and including apertures communicating with said interior;
a movable disk mounted over said fixed disk and including solid sections and open sections; and
an arm connected to said movable disk, said arm being movable to vary correspondence between said apertures in said movable disk and said open sections of said fixed disk to thereby vary valve openings defined by said fixed disk and said movable disk.

12. The airbag system of claim 11, further comprising a mounting pin for rotatably mounting said movable disk to said fixed disk.

13. The airbag system of claim 11, further comprising a movement mechanism for moving said arm.

14. The airbag system of claim 13, wherein said movement mechanism comprises a solenoid, bi-morph piezo-electric element, ferro-magnetic arrangement or drive or a thermal-based arrangement.

15. The airbag system of claim 11, wherein said fixed disk is attached around its periphery to said outer layer of said sheet of material.

16. An airbag arranged to be coupled to an inflator which inflates the airbag, comprising:

a sheet of material defining an interior and having a pre-deployment, folded configuration and a deployment, unfolded configuration in which said interior is filled with fluid, said sheet of material defining an inlet opening through which fluid generated by the inflator is passed into said interior and a separate discharge opening spaced from said inlet opening; and
a discharge valve adapted to be arranged apart from the inflator and including
a fixed member arranged over said discharge opening and attached to said sheet of material, said fixed member having apertures communicating with said interior via said discharge opening; and
a movable member having open sections and solid sections,
said movable member being movable relative to and alongside said fixed member to vary the correspondence between said apertures in said movable member and said open sections in said fixed member to thereby vary valve openings defined by said fixed member and said movable member.

17. The airbag system of claim 1, further comprising a mounting pin for rotatably connecting said movable member to said fixed member and retaining said movable member in connection with said fixed member.

18. The airbag system of claim 17, wherein said mounting pin extends through a center of said movable member.

19. The airbag system of claim 11, further comprising a mounting pin for rotatably connecting said movable disk to said fixed disk and retaining said movable disk in connection with said fixed disk.

20. The airbag system of claim 19, wherein said mounting pin extends through a center of said movable disk.

21. The airbag of claim 16, further comprising a mounting pin for rotatably connecting said movable member to said fixed member and retaining said movable member in connection with said fixed member.

22. The airbag of claim 21, wherein said mounting pin extends through a center of said movable member.

23. In an airbag system including an airbag having an inlet opening and an inflator for inflating the airbag by directing fluid into an interior of the airbag through the inlet opening, the improvement comprising:

the airbag comprising a sheet of material defining an interior and having a pre-deployment, folded configuration and a deployment, unfolded configuration in which said interior is filled with fluid, said sheet of material defining the inlet opening and a separate discharge opening spaced from said inlet opening; and
a discharge valve arranged apart from the inflator and including
a fixed member arranged over said discharge opening and attached to said sheet of material, said fixed member having apertures communicating with said interior via said discharge opening; and
a movable member having open sections and solid sections,
said movable member being movable relative to and alongside said fixed member to vary the correspondence between said apertures in said movable member and said open sections in said fixed member to thereby vary valve openings defined by said fixed member and said movable member.

* * * * *